No. 859,227. PATENTED JULY 9, 1907.
A. F. JACKSON.
FISH HOOK.
APPLICATION FILED APR. 1, 1907.
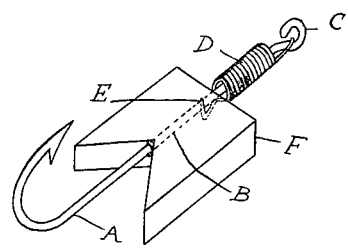
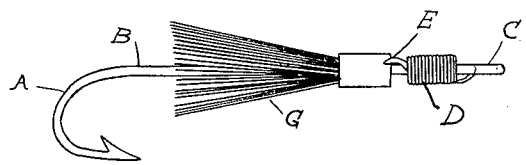
WITNESSES
INVENTOR
ARTHUR F. JACKSON

UNITED STATES PATENT OFFICE.

ARTHUR FAY JACKSON, OF CHICAGO, ILLINOIS, ASSIGNOR OF ONE-HALF TO WILLIAM S. JACKSON, OF DETROIT, MICHIGAN.

FISH-HOOK.

No. 859,227.  Specification of Letters Patent.  Patented July 9, 1907.

Application filed April 1, 1907. Serial No. 365,788.

*To all whom it may concern:*

Be it known that I, ARTHUR FAY JACKSON, a citizen of the United States of America, residing at Chicago, in the county of Cook and State of Illinois, have invented certain new and useful Improvements in Fish-Hooks, of which the following is a specification, reference being had therein to the accompanying drawings.

It is the object of the invention to yieldingly attach the bait to the hook in such a manner that when seized by the fish very little pull is exerted until the hook is securely engaged. At the same time, it is an object to render the attachment of the bait secure and so positioned that it is always in the path of the hook.

With these objects in view, the invention consists in the construction as hereinafter described.

In the drawings, Figure 1 is a perspective view of a hook to which my improvement is attached, and Fig. 2 is an elevation illustrating my improvement with a different form of bait.
A is a fish hook of any ordinary construction, having the shank B with an eye C at the end thereof, to which the line is attached.

D is a yielding member, preferably a light coiled spring, one end of which is attached to the eye C, the opposite end being provided with a hook or bend E for engagement with the bait. This coil is preferably sleeved upon the shank B of the hook, so that the bend or hook E is held in close proximity to said shank.

In use, the bait is attached to the hook E either as shown in Fig. 1, where the bait material, such as pork rind, is cut into the shape F, or as shown in Fig. 2, where a permanent bait is sleeved upon the shank of the hook. In each case, the bait is free to slide longitudinally upon the shank of the hook, and is attached to the hook E of the spring. When thus positioned, it is securely held from disengagement, but when seized by the fish the spring D will yield, so as to exert very little tension until the hook A catches.

The spring D, when elongated, tends to exert simultaneously a torsional stress. Thus, when the bait is seized by the fish, and the hook is drawn forward, this torsional stress will cause a rotation of the hook A in relation to the bait, so that it will engage with the fish no matter which side it may be on.

What I claim as my invention is:

1. The combination with a fish hook having a rigid shank, of a bait sleeved upon said shank, and a yielding connection between the bait and the forward end of said shank.

2. The combination with a fish hook having a rigid shank, of a coiled spring sleeved upon said shank having one end thereof attached to the forward end of said shank and its opposite end adapted for attachment to the bait.

3. The combination with a fish hook having a rigid shank and an eye at the end of the shank for attachment to the line, of a coiled spring sleeved upon said shank having one end secured to said eye and the opposite end bent to form a hook for engagement with the bait.

In testimony whereof I affix my signature in presence of two witnesses.

ARTHUR FAY JACKSON.

Witnesses:
T. E. THOMPSON,
W. J. FREDRICKS.